United States Patent
Radatti

(10) Patent No.: US 7,143,113 B2
(45) Date of Patent: Nov. 28, 2006

(54) APPARATUS, METHODS AND ARTICLES OF MANUFACTURE FOR SECURING AND MAINTAINING COMPUTER SYSTEMS AND STORAGE MEDIA

(75) Inventor: Peter V. Radatti, Conshohocken, PA (US)

(73) Assignee: CyberSoft, Inc., Conshohocken, PA (US)

( * ) Notice: Subject to any disclaimer, the term of this patent is extended or adjusted under 35 U.S.C. 154(b) by 355 days.

(21) Appl. No.: 10/032,252

(22) Filed: Dec. 21, 2001

(65) Prior Publication Data

US 2003/0140049 A1 Jul. 24, 2003

(51) Int. Cl.
*G06F 17/30* (2006.01)

(52) U.S. Cl. .............................. 707/200; 707/9; 707/204

(58) Field of Classification Search ................ 707/200, 707/201, 203, 205, 10, 100; 711/216; 717/124
See application file for complete search history.

(56) References Cited

U.S. PATENT DOCUMENTS

| 5,787,169 A | * | 7/1998 | Eldridge et al. ............ 713/165 |
| 6,594,665 B1 | * | 7/2003 | Sowa et al. ................... 707/10 |
| 6,662,198 B1 | * | 12/2003 | Satyanarayanan et al. .. 707/204 |
| 2002/0188605 A1 | * | 12/2002 | Adya et al. .................... 707/4 |
| 2003/0028761 A1 | * | 2/2003 | Platt ........................... 713/150 |

\* cited by examiner

*Primary Examiner*—Jeffrey Gaffin
*Assistant Examiner*—Neveen Abel-Jalil
(74) *Attorney, Agent, or Firm*—John F. A. Earley, III; Frank J. Bonini, Jr.; Harding, Earley, Follmer & Frailey

(57) ABSTRACT

Apparatus, methods, and articles of manufacture are claimed for securing, maintaining, monitoring and controlling computer files. Various predetermined files are hashed on the machine, providing a first data file with the file names and hash values, which data file is stored as a baseline. At desired intervals, a comparison cycle begins. A second data file is provided comprised of desired file names, which are then taken one at a time, hashed, and compared to the baseline first data file. Results are recorded as desired.

24 Claims, No Drawings

APPARATUS, METHODS AND ARTICLES OF MANUFACTURE FOR SECURING AND MAINTAINING COMPUTER SYSTEMS AND STORAGE MEDIA

FIELD OF THE INVENTION

The present invention relates to apparatus, methods and articles of manufacture for securing and maintaining computer systems and storage media. More particularly, the present invention relates to apparatus, methods and articles of manufacture for securing, maintaining, monitoring and controlling systems and storage media.

BACKGROUND OF THE INVENTION

Securing, maintaining, monitoring and controlling a computer system is a difficult task, especially in an enterprise. System administrators, trying to constantly secure systems, maintain systems, monitor systems and control systems may be overwhelmed.

Securing computer systems is difficult because of internal and external threats. Internal threats are the greatest danger to computer system security. It is estimated that eighty percent of security problems have internal causes. Internal causes may be many and varied. For example, disgruntled employees can wreak havoc on computer systems. Security problems do not have to be caused by intentional acts, either. Careless employees can destroy systems.

The remaining twenty percent of security problems have external causes. These external problems may be many and varied as well, for example, hackers and viruses constitute an all-too-real threat to computer systems.

Maintaining computer systems is difficult because of the complicated and intertwined nature of computer systems. Multiple platforms, lack of standardization among vendors, frequent conflicts among software, maintaining updates etc. can cause all sorts of difficulties for computer system maintenance.

Securing, maintaining, monitoring and controlling computer systems is complicated by the difficulty of tracking any system problems. A system administrator may simply be unable to locate the problem because of the complicated and intertwined nature of modem computer systems. Finding an internal security threat, such as a malicious employee who uses another employee's machine to corrupt the system or network, may be impossible.

Security threats are constantly changing. New security vulnerabilities are constantly being discovered in system software. New viruses are constantly being written and released. Systems can be protected against newly discovered vulnerabilities and viruses usually only after the vulnerability or virus is recognized. It is sometimes possible to guard against vulnerabilities or viruses by attempting to recognize threatening characteristics, such as telltale behavior, code sequences and the like, however, this type of detection (usually referred to as "heuristics detection,") is limited and not always accurate. Thus, frequent updates of security mechanisms, such as installing system patches, updating virus definitions regularly, etc. are necessary.

There are various tools in the prior art that attempt to secure, maintain, monitor and control systems. These tools suffer from many deficiencies. First, they are usually not designed to perform all the functions of securing, maintaining, monitoring and controlling systems. Thus the user must obtain and install a number of tools for each function. Next, the tools may themselves bring their own set of security, maintenance, etc. problems to the system, as might be the case when an antivirus program conflicts with a system monitoring program. Moreover, maintaining the tools themselves can become as separate system chore, as the tools must constantly be updated to deal with newly discovered security threats.

The majority of system protection and maintenance tools also lack platform independence. That is, they are usually designed to interface with one particular platform or operating system. By being limited to a particular operating system, protection on different platforms, such as might occur in an enterprise with UNIX, Windows, and mainframe platforms, may become very complicated.

Storage media is also subject to corruption. For example, hard drives may be corrupted as well. Accordingly, it would be helpful to have a tool providing for simple and effective securing, maintaining, monitoring and controlling storage media.

Accordingly, it is an object of the present invention to provide methods, apparatus and articles of manufacture that secure, maintain, monitor and control computer systems and storage media.

It is a further object of the present invention to provide methods, apparatus and articles of manufacture that secure, maintain, monitor and control computer systems and storage media without needing frequent updates.

It is a further object of the present invention to provide methods, apparatus and articles of manufacture that secure, maintain, monitor and control computer systems and storage media across a variety of platforms.

SUMMARY OF THE INVENTION

The present invention comprises methods, apparatus and articles of manufacture that secure, maintain, monitor and control computer systems, storage media, and transmitted data (hereinafter sometimes called "computer files") across a variety of platforms. In the preferred embodiments, the system undergoes a lock down cycle. The lock down cycle comprises securing the system in "lock-down" mode, that is, its contents (e.g., software and data) are known. A secure system state is then generated which serves as a baseline for the system. The secure system state is generated by creating hash values for the system file names as well as corresponding file names in a predetermined arrangement in a flat file. This file, called herein a secure system data file, is stored.

At intervals, a comparison cycle occurs. The comparison cycle generates a list of file names in a comparison data flat file with the same predetermined arrangement as the secure system state data file. Each file is then taken from the comparison data file, hashed, and sent to a comparison component, where it is compared to the secure system state file. If differences are noted between the file name and hash value as present in the secure system data file and the comparison data file, then the embodiment presumes alterations have occurred to the file, and various actions such as reporting, logging, etc. may be taken.

Alternatively, the comparison cycle may comprise real time comparison, that is, comparing files and their hash values to the secure system state file using a comparison component on a streaming basis. Any differences are noted as they arise and various actions such as reporting, logging, etc. may be taken.

Additionally, other embodiments provide methods, apparatus and articles of manufacture that secure, maintain, monitor and control storage media. For example, a secure media data file is constructed for the files on the media. A comparison data file is then constructed at desired intervals, and the two files compared. The result of the comparison may lead to various actions, such as reporting, logging, etc.

DETAILED DESCRIPTION OF THE PREFERRED EMBODIMENTS

The preferred embodiments comprise methods, apparatus, and articles of manufacture for securing, maintaining, monitoring and controlling computer systems, storage media, and transmitted data (hereinafter sometimes called "computer files"). In the preferred embodiments, a selected system first undergoes a lock down cycle. The lock down cycle begins with the system being secured in "lock-down" mode, that is, its contents (e.g., software and data) are known. This provides a baseline from which changes can be detected.

In certain embodiments, such as multiple system or network installation, one system may serve as a master. Subsequent systems may then be established by securely copying the entire contents of the master system, so that those subsequent systems only contain the master contents. In these embodiments, control over the multiple systems is simplified because there is no need to secure each system in lock down mode. In client-server installation, embodiments may be used to secure either or both clients and servers.

A secure system state is then generated. A secure system state is generated by creating a data file. The data file contains a date and time stamp, a hash value for each file, and the file name associated with the hash value, and is arranged in any desired predetermined manner, e.g., sorted by file name, etc. In other embodiments, the file arrangement can include "on the fly" arrangement as well. Hereinafter, the term "preordered" is used to indicate an arranged file, and "preordering" the process of arranging.

The file names are generated through methods known in the art. For example, in a UNIX system, a find command may be used, with the output piped to a file. The list is preordered. For example, in a UNIX system, an alphabetically sorted list may be generated with the sort command. A hash value, created using hashing methods as are known in the art, e.g. MD5, are used as well. It should be noted that the file names, corresponding hashes, and preordering may be created in any sequence desired in other embodiments.

The resulting flat data file is referred to hereinafter as the secure system data file. The secure system data file is retained in a storage area, either internally, i.e., on the system, and/or externally, on another system and/or storage device.

Table 1 shows an example of a secure system data file.

installations as described above, the secure system data file provides a baseline for all systems installed through copying the master contents. In yet other embodiments, a secure system data file may comprise less than the entire system contents, e.g., it may be created of a part of the system, a number of individual files, individual files, etc. Such a secure system data file might be desirable where only certain areas of the system need to be protected against proscribed code. Partial system protection might be desired, for example, where only individual files, user data, etc. need to be protected. (The use of the word "files" herein includes files, data and code within its scope.) In the preferred embodiments, the date and time stamp is not used in subsequent comparison, but may be used to determine when the file was modified, created, etc. and may be output as well.

Additionally, various embodiments might use a predetermined secure system data file. For example, a desired secure system data file for all systems in an enterprise might be established, and systems tested against the secure system data file, in a manner further described below, in order to assure their compliance with the secure system data file.

Note that some embodiments may allow for changing the scope of secure system data files in lock down cycles. For example, a system administrator might desire to generate complete secure system data files and partial secure system data files in alternate lock down cycles, such as when a user is known to only be accessing part of the system. Any other variations of lock down cycles are also possible.

In general, no matter the scope of the secure system data file, e.g., full, partial, individual file, etc., the records in the secure system data file have a one-to-one correspondence with the files that are being protected.

Once a secure system data file is established, the selected system undergoes a comparison cycle. The comparison cycle begins when desired, and establishes a comparison state. A comparison state is generated by identifying those files that are to be used in the comparison cycle. For example, all system files, etc. might be used in a comparison cycle, such as when the entire system is to be monitored. Alternatively, as is further described herein, another file set may be used as well. It should be noted that the identification of files may be manual or automatic, and need not be done anew for a comparison cycle. For example, it may be desired to establish a set of system files to be used in a regular, automatic comparison cycle. The files are then examined in an essentially "hands-off" proceeding, and automatic security maintenance of the system is provided to the user. Thus

TABLE 1

| DATE AND TIME | HASH VALUE | FILE NAME |
| --- | --- | --- |
| 2001/08/29 1547 | 5652e749873b7e4cdea4b43347fc0aa7 | d:\temp\binhex_expand.c |
| 2001/08/29 1547 | 46bba5bf8f3ff708e8fcd9c3933fa9b7 | d:\temp\cyber.ZIP |
| 2001/08/29 1547 | e8e0f1f5305718a03432a09fe38ab007 | d:\temp\infected\marburg.exe |
| 2001/08/29 1547 | 4425491c92ff6006de8319731c609a25 | d:\temp\infected\terror.exe |
| 2001/08/29 1547 | 1d3cfcb0304bb831e1ebc3c58f909ba7 | d:\temp\marburg.txt |
| 2001/08/29 1547 | b1e54f0b4f2b068895052cce53532737 | d:\temp\marburg_fprot.txt |
| 2001/08/29 1547 | 13dceec9f7cd18d5e3242d34d77cb984 | d:\temp\marburg_norton.txt |
| 2001/08/29 1547 | 1cb4e066d37288e752a5575a0b7d3ea5 | d:\temp\regsvr32.exe |
| 2001/08/29 1547 | 18918429057543820d4daec3dc49ca9c | d:\temp\regsvr32.txt |

The secure system data file provides a baseline for subsequent comparison. It should be noted that in certain embodiments, such as those involved in multiple system the user may never be aware that his or her machine is being examined. As another example, recently added and/or modified files may be assembled automatically in a comparison data file for an automatic comparison cycle. As this and other examples illustrate, automatic or manual operation may be entirely transparent to the user.

The data file contains the chosen file(s), and is preordered in the same manner as the secure system data file.

In the preferred embodiments, the comparison data file is generated in a similar manner as the secure system data file. The file names are generated through methods known in the art. For example, in a UNIX system, a find command may be used, with the output piped to a file. The list may be preordered. For example, in a UNIX system, an alphabetically sorted list may be generated with the sort command.

The resulting flat data file is referred to hereinafter as the comparison data file.

Table 2 shows an example of a comparison data file.

TABLE 2

| FILE NAME |
| --- |
| d:\temp\CLEANER.TXT |
| d:\temp\F-HAPPY.PAS |
| d:\temp\KILL858.PAS |
| d:\temp\TEST_DEC.PAS |
| d:\temp\UNICE.PAS |
| d:\temp\UNICE_R.PAS |
| d:\temp\VBS_DEC.PAS |

Files are then taken one at a time, starting with the first or "top" file, and sent to a client comparison component. The client comparison component creates a hash value for each file name, using hashing methods as are known in the art, e.g., MD5. The file name and hash value are then compared to the secure system data file. Various actions are taken based upon possible results of the comparison:

If a file name exists in both the comparison data file and the secure system data file, and the hashes of the file name are identical in the comparison data file and the secure system data file, then the files are presumed to be identical.

If a file name exists in the comparison data file but not in the secure system data file, the file is presumed to be new.

If a file name exists in the comparison data file and the secure system data file, and the hashes of the file name are different in the comparison data file and the secure system data file, the file is presumed to be modified.

If a file name and a corresponding hash value are present in the secure system data file, but not in the comparison data file, the file is presumed to be deleted.

If a file name exists in either the secure system data file or the comparison data file, but there is no corresponding hash value, the file is presumed to be empty.

If more than one hash value in the comparison data file matches a hash value in the secure system data file, the files are presumed to be duplicates.

If a hash value exists in either the secure system data file or the comparison data file, but there is no corresponding file name, the file is presumed to be unnamed.

The results are used as desired, including dissemination to a report or client comparison status mechanism described below. The cycle is then repeated with a second file, removed from the comparison data file, sent to the client comparison component hashed, compared against the files in the secure system data file, the results used as desired, as so on, until all the files in the comparison data file are reviewed.

In certain preferred embodiments, if any new, modified, deleted, duplicate, empty and/or unnamed files exist, they are identified in a comparison report. Of course, as described below, other embodiments may take different actions instead of or in addition to a comparison report.

Preordering of the data files permits an increase in comparison efficiency. Although preordering is done in the preferred embodiments as the data files are created, it may be done before comparison, by the client comparison component. For example, the hash values of the comparison data files, once created, may be retained and sorted in certain embodiments, in order to detect duplicates rapidly.

The client comparison component might be internal to the system or external to the system. If the component (and/or the storage area referred to above) is external to the system, the preferred embodiments use a secure connection to the component, in the preferred embodiments, such as an SSL connection, a VPN connection, etc. 13

A comparison cycle might include additional comparisons by the comparison data file against one or more alternative data files, i.e., other than the secure system data file. For example, a data file of dangerous file hash values, such as viruses, back doors, trap doors, Trojan horses, etc. might be constructed and used during the comparison cycle. Thus the comparison data file would be compared both against the secure system data file as well as against a database of known dangerous hash values. It should be emphasized that files in the comparison data file need to be compared only to a baseline such as the secure system data file to discover anomalous files, e.g., viruses, Trojan Horses, etc. In such an embodiment, the anomalous files are detected by their presence, insofar as they were not been present in the initial secure system data file, however there is no need for affirmative detection of the anomalous file hash values, and so there is no need to update any file definitions. In those embodiments that may additionally or alternatively use an alternative date file, such as a dangerous hash value file, any such dangerous files will be identified by their hash values. These embodiments preferably use an regularly updated hash value database.

It should be noted that comparison against alternative data files may be selected or not in certain preferred embodiments. That is, the user may choose to have the comparison data file compared to one or more of the secure system data files, alternative data files, etc. This optional use of alternative data files may be as desired. For example, use of alternative data files may be on various predetermined cycles (e.g., a comparison against a dangerous file hash data values) may be on random cycles, may be at the user's option, etc.

In general, in the various embodiments, an authorized user can select the desired comparison options against the desired secure system and/or alternative data file(s), e.g., new files, modified files, deleted files, empty files, danger hashes, duplicate hashes, etc.

Table 3 shows an example of a comparison report.

TABLE 3

Wed Aug 29 15:47:32 2001
*******************************************
New files:

d:\temp\CLEANER.TXT
d:\temp\F-HAPPY.PAS
d:\temp\KILL858.PAS
d:\temp\TEST_DEC.PAS
d:\temp\UNICE.PAS
d:\temp\UNJCE_R.PAS
d:\temp\VBS_DEC.PAS TABLE 3-continued

```
*************************************************************
Modified files:
*************************************************************
*************************************************************
Deleted files:
*************************************************************
*************************************************************
Danger hashes:
*************************************************************
*Not selected by user*
*************************************************************
Duplicate hashes:
*************************************************************
*Not selected by user*
```

Various actions may be taken depending upon the report results. For example, if no files are reported as anomalous, e.g., new, modified, deleted, etc., the client is presumed to have maintained its secure system state, and no further action is taken. As another example, if there are anomalous files, the system may be isolated, taken offline, etc., until any anomalous files are investigated, the system rolled back or restored, etc.

Of course, other reporting, logging, reactive and/or alerting mechanisms as known in the art may be used, as known in the art, in addition to those described herein. Generally, these are referred to herein as comparison cycle status mechanisms.

The comparison cycle status mechanism may be manual or automatic in various embodiments. For example, in certain embodiments, the detection of any dangerous hash value might automatically transmit the associated file to an antivirus or other similar product for review and/or disinfection. While the review is done, the file is copied into a buffer and the original deleted from the system, and so the system is protected from the file. A report is generated to a system administrator as well, to notify him or her of the unsecure file.

A comparison cycle might also include, in various embodiments, internal comparison, that is, among the hash values existing on the comparison data file and/or the secure system data file. For example, if the same hash values exist more than once in the same data file, they are presumed to be duplicates (due to the unique nature of hash values) and will be reported, logged, etc. accordingly.

The preferred embodiments protect the system against alteration because any variation from the secure system state will be detected. The nature of the file will not matter insofar as any file that modifies the system and/or its files will be detected. For example, if new files are added to the system, as happens with certain viruses, the new file names will be detected, as they will appear in the comparison cycle. For example, if an unauthorized user changes the contents of existing files, the hash values of the originally secure files and the file modified by the virus will differ. For example, if an unauthorized user deletes or hides files, the file names or hash values will be identified as deleted or missing.

In certain embodiments, modification of the system is offered as well. For example, a system that has been altered may be restored, manually or automatically, to its secure system state if desired, e.g. by retrieval of a known good copy of the affected file(s) from a back up system, by removal of new software that may cause system crashes, such as bad drivers, etc.

By use of various embodiments of the present invention, systems, partial systems, and/or files may be protected. For example, a comparison data file might be constructed of only part of the system, and compared against a secure system data file comprised of only part of the system.

It should also be noted that one-to-one correspondence between a secure system data file and comparison system state string is not necessary. For example, embodiments may also use a secure system data file that may be subdivided into various sub-secure system data files, so that a comparison state string may be constructed and compared against one or more of the sub-secure system data files. Such an embodiment might be used where a partial secure system state is all that is desired, for example. Additionally, in certain embodiments, such as those involved in multiple system installations as described above, the secure system data file obtained from the master system is used for comparison against the comparison state data file(s) of any copied system(s.) This also allows for the comparison of any desired system against a standard or idealized system.

It should be noted that the file name is used primarily for user convenience. The file name provides the user with the ability to identify any new, modified, deleted, etc. files. Therefore, in certain embodiments, it may be possible that there is no file name associated with the hash values in any data file. For example, certain types of magnetic storage media have no file names for the data stored therein. In this event, another file identifier, or none at all, may be used.

Other parameters might also use different comparison cycles. For example, comparison cycles may occur on regular, irregular, predetermined, random, real time, etc. intervals. Additionally, full comparison cycles may be alternated as desired with partial comparison cycles. Comparison cycles need not be isolated incidents. That is, embodiments may offer streaming comparison cycles. These streaming comparison cycles continually compare system file(s) to a baseline, e.g., a secure system state; a partial secure system state, alternate system data files, etc. Such an embodiment is useful in a system that constantly interacts with other systems, e.g., a network server. By constantly reviewing the status of desired file(s), e.g. system files on a network server, against a baseline, e.g. a partial secure system data file of the system files, the security of the server is maintained.

Preferred embodiments with streaming comparison cycles use a secure system state generated as described herein. Additionally, a Loop Back process, as described herein, is also desirably used. A comparison state is established, providing the file(s) to be tested, and a comparison data file constructed. Establishing a comparison state and constructing a comparison data file is a continuous process. That is, as soon as a comparison data file is sent to the comparison component, a new comparison data file is constructed. As comparison data file are constructed, they are sent to a client comparison component, where they are compared to the secure system data file. The comparison occurs on a record by record basis with each data file (i.e. the secure system data file and the comparison data file.) It should be noted that streaming is not limited to comparison data files, and, in various embodiments, secure system data file(s), comparison data file(s) and alternative data file(s) may be constructed on an ongoing basis.

Additionally, reporting, logging, reactive and/or alerting mechanisms are different in different embodiments. For example, an alert may not be generated on detection of new and/or modified files. Instead a report or other record may be made. Additionally, as described above, a system modification tool might also be offered, restoring the system to a secure system state.

The construction of data files may be an iterative process. For example, through a Loop Back process, files that may be identified as incongruent with the secure system state, yet which are then authorized by a user, may be added to a secure system data file in preparation for the next comparison cycle. The authorization process by the user could be manual or automatic, so that, for example, files identified as new or modified could be sent to an antivirus application or other file scanning application for review and/or disinfection automatically. For example, VFIND®, from CyberSoft, Inc., is one product that protects systems and networks from proscribed code. If the file passes the review, it may then be added to the secure system data file so that it is not flagged as new during the next comparison cycle. It may also be possible to have the file not pass the review. In such an event, the file may be reported, logged, etc.

In certain embodiments, it may be desired to maintain historical records of use of the embodiment. For example, if secure system data files are modified by a Loop Back mechanism as explained above, they may still be retained in order to record system history, provide for system roll-backs (also known as "restores,") etc. Other files may be retained as well including, for example, alternative data files and comparison data files for a number of reasons, e.g. future use, system roll backs, triggering other actions, etc.

Loop Back Mechanisms may also be used in the preferred embodiments to construct alternative data files. For example, a dangerous hash value data file may be generated, supplemented, updated, etc. through detection of dangerous files in the following manner. Any file that, after being reviewed in a comparison cycle, is determined to be new, modified, etc., is sent to a proscribed code scanner. The file is reviewed by the proscribed code scanner. If the file contains dangerous code, it is sent to a hashing component which generates a hash value. That hash value will then be added to a dangerous hash value data file.

After a dangerous hash value data file is established, a comparison cycle may use or not the dangerous hash value data file for comparison purposes as desired by the user, e.g., either in addition to or instead of the secure system data file. The comparison cycle will compare the comparison state data file against the secure state data file and/or the dangerous hash data file and report on new modified, dangerous, etc. files.

Of course, other alternative data files may be constructed and these data files may contain any desired hash values for use in comparison cycles. For example, an alternative data file may be constructed through a Loop Back process or mechanism, a preconstructed alternative data file may be used, a mandated alternative system data file may be used, which tests for necessary files on the system.

By use of a comparison data file, comparison cycle, and secure system and/or alternative data file(s), preferred embodiments permit review of the state of a system and/or systems, partial system(s), and/or files against a baseline and/or desired system state. Thus, in addition to the descriptions above, embodiments may also be used to eliminate unwanted programs and data, search for duplicates, ensure Trojan Horse detection, etc.

Although the term "system" has been used throughout to describe the various embodiments, it should be noted that other embodiments may be used as well to secure, maintain, monitor and control storage media. For example, magnetic media suffers from degradation and/or corruption due to any number of causes. By use of embodiments of the present invention, the media can be secured through generating a secure media state of the data present on the media and comparing data files obtained during that state (and/or any other alternative data files) to subsequent comparison data files.

Once a comparison cycle is run, any anomalous file(s) may be automatically or manually deleted, sent to a system administrator, sent to an antivirus administrator, etc. In preferred embodiments using a dangerous alternative data file comparison cycle, an automatic delete component will delete any dangerous file(s) from the system.

The embodiments may be executed on any media desired, e.g. magnetic, including hard drives, floppy drives, tape, optical storage, silicon storage, etc. Additionally, the data files, comparison cycles, etc. may be varied as set forth above with regard to the system embodiments. Additionally, the media embodiments and the system embodiments are not exclusive, i.e., an especially secure state may be achieved by establishing both a secure media state on any desired media as well as a secure system state and running the respective comparison cycles as desired.

Embodiments may be used as well to ensure the integrity of transmitted data. For example, by a recipient comparing the hashed transmitted content to a secure system data file, he or she can determine whether the content has maintained pretransmission integrity.

Embodiments may be used as well to date and/or time stamp information by creating associations between files and the date/time in which the association is made. This process may be used to fix the content and/or date of email, EDI transactions or any other file or combination of files into a form which is then demonstrably unchanged from the original as of a specific data and time.

An especially preferred embodiment of the present invention runs on a Unix® such as System V, Sun Solaris®, IBM AIX®, HP-UX®, etc. The description of the preferred embodiments uses Sun Solaris® operating system Unix® terminology. However, it should be specifically understood that embodiments can be implemented in other Unix® and Unix®-like platforms, including but not limited to Linux® and its variants, as well as other operating system platforms including but not limited to Microsoft Windows® XP, Microsoft Windows® NT, Windows® 2000, Windows® 95, 98 and Me, IBM MVS, IBM OS/390, SNA, 3270 RJE, MacOS, VxWorks® and others.

In alternate embodiments, the invention comprises an article of manufacture, or signal-bearing medium, containing computer readable code. Examples of such articles include tarred code and other types and/or methods of storing, archiving and/or compressing code known in the art, contained on any media known in the art, such as CD-ROM's, floppy disks, etc.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

The invention claimed is:

1. A method for securing computer files comprising:
generating a secure system data file, creating a first hash value for a first file, said first file having file contents, wherein said first hash value is comprised of the contents of said first file, and arranging said first hash value with a respective first file's name;
storing said secure system file; and, comparing said secure system file to a comparison file in a comparison cycle, wherein said comparison file further comprises at least a second file, and wherein said comparison cycle further comprises hashing contents of said second file, generating a second hash value, and sending said second hash value and its respective second file's name to a comparison component, whereby said second file hash value is compared to said first file hash value, wherein records in the secure system data file have a one-to-one correspondence with the contents of a respective file, a respective file name, and the hash value of the contents of the respective file name.

2. A method for securing, maintaining, monitoring and controlling computer files comprising:

providing a first data file, comprised of at least one first data file file name as well as a first data file hash value, wherein said data file hash file is comprised of the contents of each file referred to by each of said first data file file names;

providing a second data file, comprised of at least one second data file file name;

comparing said second data file to said first data file in a comparison cycle, wherein said comparison cycle further comprises;

obtaining each file referred to by each of said second data file file names;

generating a second data file hash value for each one of said second data file file names, and when the said file corresponding to the second second data file file name does not exist providing notification of that, wherein said data file hash file is comprised of the contents is each file referred to by each of said second data file file names;

sending each second data file hash value and each second data file file name to a comparison component.

3. The method of claim 2 further comprising repeating the steps of:

obtaining each file referred to by each of said second data file file names;

generating a second data file hash value for each file referred to by each of said second data file file names;

sending each second data file hash value and each second data file file name to a comparison component.

4. The method of claim 2 further comprising the step of: comparing each second data file hash value to each first data file hash value.

5. The method of claim 2 further comprising the step of providing a first data file further comprises proving a secure system data file.

6. The method of claim 2 further comprising the step of providing a first data file further comprises providing an alternative data file.

7. The method of claim 2 further comprising the step of reporting the results of said comparison cycle.

8. The method of claim 2 further comprising the step of logging the results of said comparison cycle.

9. The method of claim 2 further comprising the step of sending the results of said comparison cycle to a client comparison status mechanism.

10. The method of claim 2 wherein the step of generating a first data file further comprises using a Loop Back mechanism to generate said first data file.

11. The method of claim 1 further comprising the step of reporting the results of said comparison cycle.

12. The method of claim 1 further comprising the step of logging the results of said comparison cycle.

13. The method of claim 1 further comprising the step of securing a system in lock down mode.

14. The method of claim 1 further comprising the step of sending the results of said comparison cycle to a client comparison status mechanism.

15. The method of claim 1 further comprising the step of generating a secure system data file, further comprises a Loop Back mechanism to generate said secure data file.

16. An apparatus for securing, maintaining, monitoring and controlling computer files comprising:

a first data file, comprised of at least one first data file file name as well as a first data file hash value, wherein said data file hash file is comprised of contents of each file referred to by each of said first data file file names;

a second data file, comprised of at least one second data file file name;

whereby said second data file is compared to said first data file, by: a means for obtaining each file referred to by each of said second data file file names, a means for generating a second data file hash value for each one of said second data file file names, and when the said file corresponding to the second second data file file name does not exist providing notification of that, wherein said data file hash file is comprised of contents is each file referred to by each of said second data file file names;

a means for sending each second data file hash value and each second data file file name to a comparison component.

17. The apparatus of claim 16 whereby said comparison component further comprising means for comparing each second data file hash value to each first data file hash value.

18. The apparatus of claim 16 wherein said first data file further comprises proving a secure system data file.

19. The apparatus of claim 16 wherein said first data file further comprises proving an alternate data file.

20. The apparatus of claim 16 further comprising means for reporting the results of said comparison cycle.

21. The apparatus of claim 16 further comprising means for logging the results of said comparison cycle.

22. The apparatus of claim 16 further comprising means for sending the results of said comparison cycle to a client comparison status mechanism.

23. The apparatus of claim 16 further comprising Loop Back mechanism means.

24. The apparatus of claim 23 whereby said first data file is generated by said Loop Back mechanism means.

* * * * *